United States Patent
Becker

(10) Patent No.: US 8,342,488 B2
(45) Date of Patent: *Jan. 1, 2013

(54) DAMPING CYLINDER WITH ANNULAR BLADDER

(75) Inventor: William M. Becker, Aptos, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,205

(22) Filed: Sep. 17, 2010

(65) Prior Publication Data

US 2011/0005877 A1   Jan. 13, 2011

Related U.S. Application Data

(62) Division of application No. 11/291,058, filed on Nov. 29, 2005, now Pat. No. 7,921,974.

(51) Int. Cl.
*F16F 9/14* (2006.01)
*F16F 9/00* (2006.01)

(52) U.S. Cl. ........... 267/64.15; 188/322.19; 188/322.16; 188/322.17; 188/284; 188/314

(58) Field of Classification Search .................. 188/322, 188/19, 16, 17, 284, 314
See application file for complete search history.

(56) References Cited

U.S. PATENT DOCUMENTS

| | | | |
|---|---|---|---|
| 2,308,404 A | 1/1943 | Thornhill | |
| 2,352,351 A | 6/1944 | Thornhill | |
| 2,357,278 A | 8/1944 | O'Connor | |
| 2,571,279 A | 10/1951 | Myklestad | |
| 2,708,112 A | 5/1955 | Seddon | |
| 2,743,102 A | 4/1956 | Seddon | |
| 2,957,703 A | 10/1960 | Ross | |
| 3,024,875 A | 3/1962 | Stultz | |
| 3,123,347 A | 3/1964 | Stormer | |
| 3,140,085 A | 7/1964 | DeCarbon | |
| 3,151,706 A | 10/1964 | Dillenburger | |
| 3,173,671 A * | 3/1965 | Broadwell | 267/64.21 |
| 3,222,049 A | 12/1965 | Tuczek | |
| 3,223,401 A | 12/1965 | Peterson | |
| 3,269,718 A | 8/1966 | DeCarbon | |
| 3,287,008 A | 11/1966 | Fernandez | |
| 3,532,195 A | 10/1970 | Lohr | |
| 3,535,194 A | 10/1970 | Johnson | |
| 3,552,766 A * | 1/1971 | Willich | 80/124.127 |
| 3,587,789 A | 6/1971 | Kellholz | |
| 3,593,977 A | 7/1971 | Hahn | |
| 3,603,576 A | 9/1971 | Hahn | |
| 3,625,321 A * | 12/1971 | Lutz | 188/298 |
| 3,658,313 A | 4/1972 | Hahn | |

(Continued)

FOREIGN PATENT DOCUMENTS

FR    2079874 A5    11/1971

(Continued)

*Primary Examiner* — Bradley King
*Assistant Examiner* — Mahbubur Rashid
(74) *Attorney, Agent, or Firm* — Patterson & Sheridan, L.L.P.

(57) ABSTRACT

An improvement to damping cylinders in which the damping fluid needs to be separated from a gas is disclosed. In particular, an annular bladder is used. An annular bladder allows for a control shaft to extend at least a portion of the length of the damping cylinder. This configuration effectively and simply reduces most issues that result from when an IFP is used for the same purpose.

14 Claims, 4 Drawing Sheets

U.S. PATENT DOCUMENTS

| Patent Number | | Date | Inventor(s) | Reference |
|---|---|---|---|---|
| 3,674,120 | A | 7/1972 | Johnson | |
| 3,774,895 | A | 11/1973 | Willich et al. | |
| 3,844,544 | A | 10/1974 | Keilholz | |
| 3,891,199 | A | 6/1975 | Willich et al. | |
| 3,904,002 | A | 9/1975 | Adrian et al. | |
| 3,945,663 | A | 3/1976 | Duckett | |
| 4,010,829 | A | 3/1977 | Naito et al. | |
| 4,122,923 | A | 10/1978 | Ellis et al. | |
| 4,132,395 | A | 1/1979 | Fox, Jr. | |
| 4,145,067 | A | 3/1979 | Ceriani | |
| 4,153,237 | A | 5/1979 | Supalla | |
| 4,226,408 | A | 10/1980 | Tomita et al. | |
| 4,311,302 | A | 1/1982 | Heyer et al. | |
| 4,342,447 | A * | 8/1982 | Marx | 267/64.23 |
| 4,342,884 | A | 8/1982 | Ban et al. | |
| 4,352,487 | A | 10/1982 | Shtarkman | |
| 4,401,298 | A | 8/1983 | Eaton et al. | |
| 4,443,926 | A | 4/1984 | Pearson et al. | |
| 4,491,207 | A | 1/1985 | Boonchanta et al. | |
| 4,515,253 | A | 5/1985 | Itoh et al. | |
| 4,560,042 | A | 12/1985 | Sell et al. | |
| 4,664,234 | A | 5/1987 | Wight et al. | |
| 4,700,815 | A * | 10/1987 | Persicke et al. | 188/286 |
| 4,732,244 | A | 3/1988 | Verkuylen | |
| 4,742,898 | A * | 5/1988 | Lee | 188/287 |
| 4,762,308 | A | 8/1988 | Geno | |
| 4,880,213 | A | 11/1989 | Shinbori et al. | |
| 4,958,706 | A | 9/1990 | Richardson et al. | |
| 4,961,482 | A | 10/1990 | Pohlenz et al. | |
| 5,042,625 | A | 8/1991 | Maus et al. | |
| 5,094,325 | A | 3/1992 | Smith | |
| 5,458,219 | A | 10/1995 | Anderson | |
| 5,597,054 | A | 1/1997 | Nagai et al. | |
| 5,957,252 | A | 9/1999 | Berthold | |
| 6,234,461 | B1 * | 5/2001 | Bohm et al. | 267/64.12 |
| 6,318,525 | B1 | 11/2001 | Vignocchi et al. | |
| 6,415,895 | B2 | 7/2002 | Marking et al. | |
| 6,450,307 | B2 | 9/2002 | Lutz | |
| 6,464,212 | B2 | 10/2002 | Lutz | |
| 6,467,760 | B2 * | 10/2002 | Lutz | 267/64.28 |
| 6,557,674 | B2 | 5/2003 | Vignocchi et al. | |
| 6,695,105 | B2 | 2/2004 | Toiyama | |
| 2003/0019701 | A1 * | 1/2003 | Hodgson | 188/298 |
| 2003/0030196 | A1 | 2/2003 | Mason | |
| 2004/0020730 | A1 | 2/2004 | Turner | |

FOREIGN PATENT DOCUMENTS

| | | | |
|---|---|---|---|
| FR | 2194267 | A6 | 2/1974 |
| GB | 0946725 | A | 1/1964 |
| GB | 1121154 | A | 7/1968 |
| IT | 1192208 | B | 3/1988 |
| IT | 1192209 | B | 3/1988 |
| SE | 0147555 | C1 | 11/1954 |
| WO | WO-03/027532 | A2 | 4/2003 |

* cited by examiner

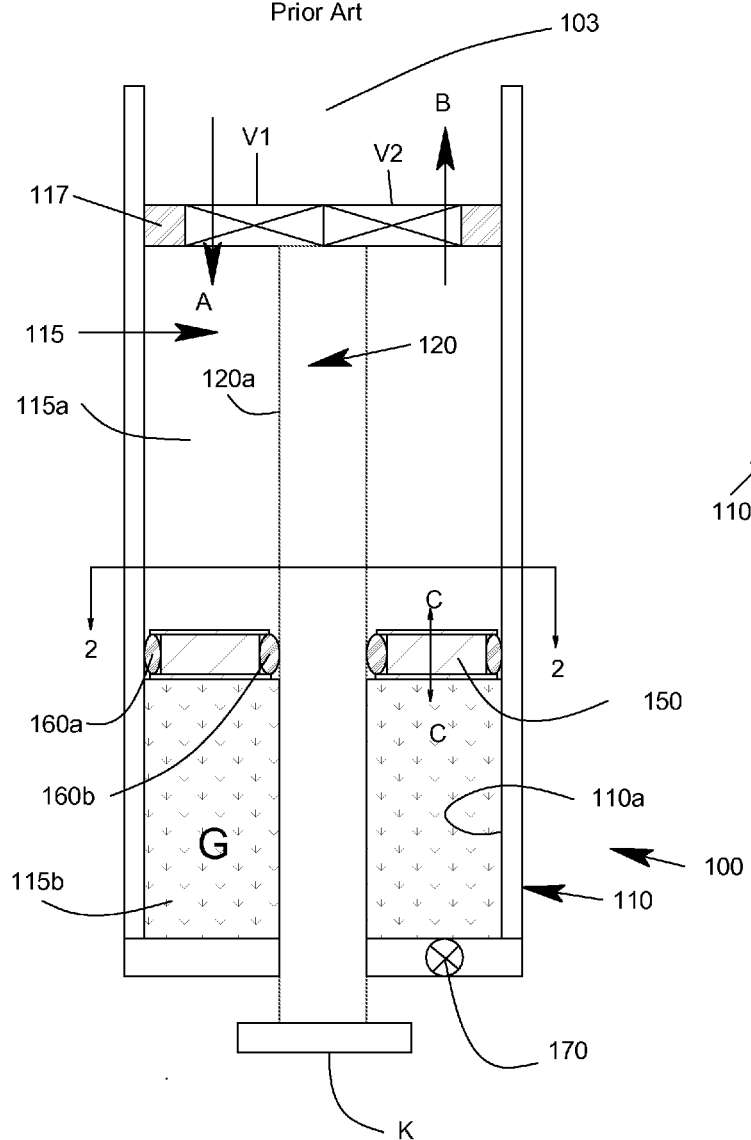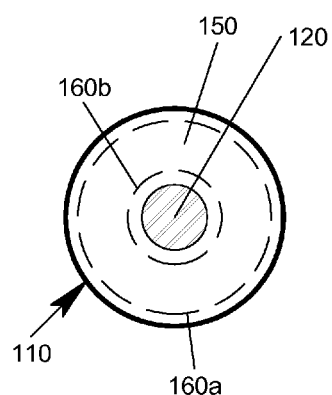

DAMPING CYLINDER WITH ANNULAR BLADDER

CROSS-REFERENCE TO RELATED APPLICATIONS

This application is a divisional of co-pending U.S. patent application Ser. No. 11/291,058 filed Nov. 29, 2005, which is herein incorporated by reference.

BACKGROUND OF THE INVENTION

1. Field of the Invention

The invention is generally related to the field of damping cylinders. More particularly, the present invention is an improvement to damping cylinders previously having both internal floating pistons and shafts.

2. Description of the Related Art

The use of internal floating pistons, also known as and will be referred to herein as IFPs, in damping cylinders to compensate for volume changes due to the displacement of damping fluid within the damping cylinder and thermal expansion of the damping fluid, is well known. For example, the following Fox Racing Shox (Fox Factory, Inc.) patents depict the use of an IFP: U.S. Pat. No. 6,135,434; U.S. Pat. No. 6,296,092; U.S. Pat. No. 6,311,962; U.S. Pat. No. 6,360,857; U.S. Pat. No. 6,415,895; and U.S. Pat. No. 6,604,751 and are incorporated by reference herein as are all the patents and published patent applications referred to within this patent application.

Furthermore, it is often common to have shafts extending the longitudinal length of the damping cylinder. The shaft may comprise a piston rod, a valve control rod, or a combination of both. For example, in FOX U.S. Pat. No. 6,360,857, we depict the use of a shaft extending the length of the damping cylinder wherein the shaft comprises a piston shaft and a control shaft. In another FOX patent, the shaft passes through the IFP. See U.S. Pat. No. 6,415,895 (FIG. 7).

SUMMARY OF THE INVENTION

The present invention is an extremely simple to implement improvement and innovation in damping cylinders, and especially those damping cylinders that may have originally been designed to have both IFPs and shafts or in any other damping cylinder.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a simplified schematic depicting a prior art damping cylinder having an IFP and a shaft.

FIG. 2 is a cross section along line 2-2 of FIG. 1.

DETAILED DESCRIPTION

Figure 6:
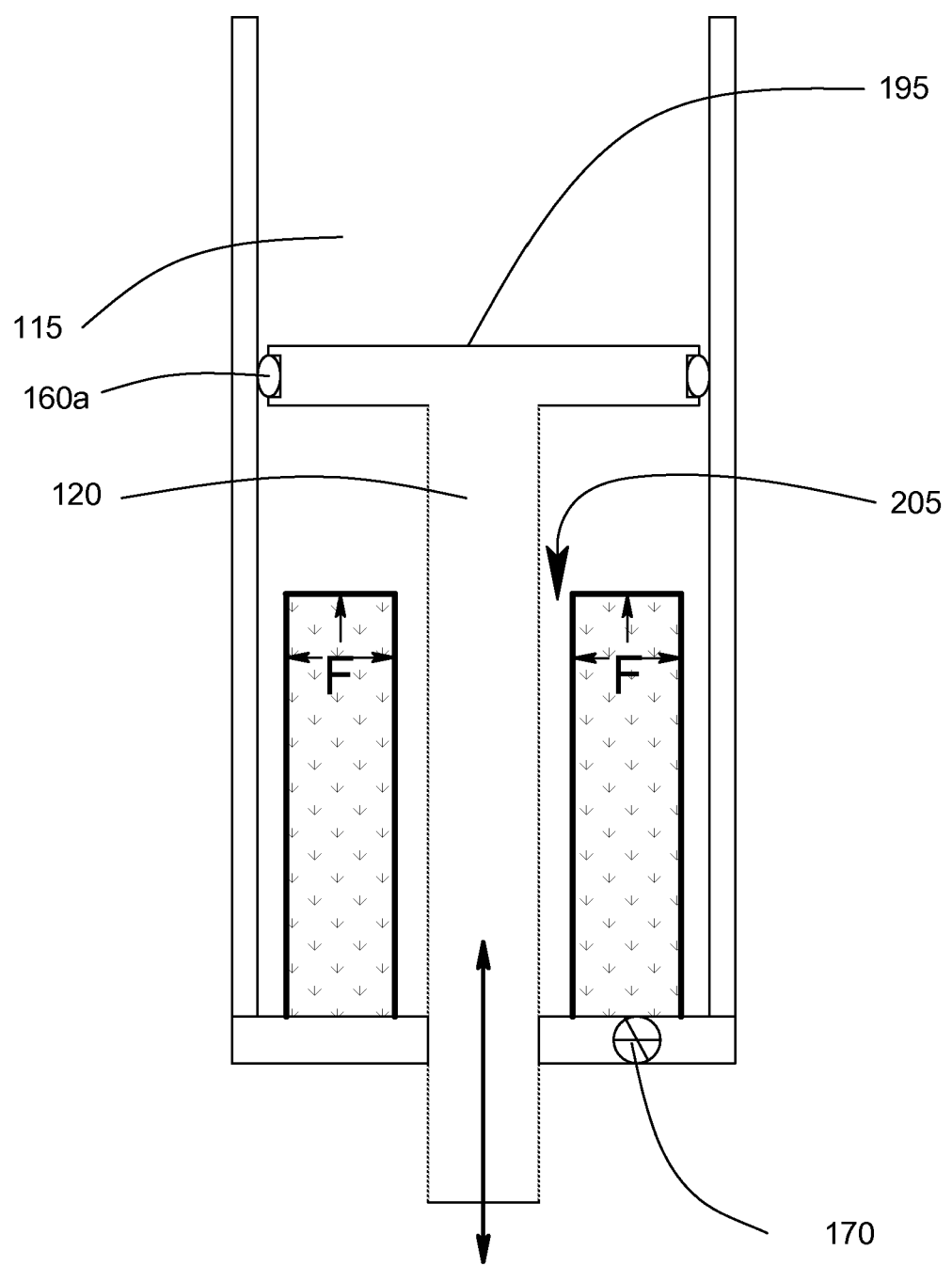
FIG. 6 is a simplified schematic of a damping cylinder according to a second exemplary embodiment of the invention.

FIG. 1 is a simplified schematic depicting a prior art damping cylinder having an IFP and a shaft. FIG. 2 is a cross section along line 2-2 of FIG. 1. Damping cylinders such as these have widespread application in many diverse devices, including but not limited to, shock absorbers and forks for two-wheeled vehicles. Damping cylinder 100 generally comprises a cylinder body 110 having an inner wall 110a and that is divided into fluid chamber 103 and fluid chamber 115 by a partition 117. Partition 117 may comprise a wall (as shown) or a piston (not shown) sealed against inner wall 110a. Fluid will be able to flow into (arrow A) and out of (arrow B) fluid chamber 115 via conventional fluid flow control valves V1, V2, such as check valves, spring-biased valves or deflectable disc valves (shown schematically and collectively in black-box form by valves V1, V2). In other situations, such as will be described with respect to FIG. 6, fluid chamber 115 will contain an axially movable shaft 120 supporting a piston 195 having a seal 160a and are used to impart a force onto and displace the damping fluid within fluid chamber 115. Fluid chamber 115 generally comprises a single open volume defined by inner walls 110a of cylinder body 110. Furthermore, extending a substantial length of cylinder body 110 is a shaft 120 having a shaft surface 120a. As previously mentioned, the shaft 120 may comprise a piston rod, a valve control rod, or a combination of both. For example, as shown in FIG. 1, by turning knob K on the end of shaft 120, through a mechanism passing through shaft 120, it is possible to control one or more flow characteristics of valves V1, V2. While in no way critical to this invention, valves V1, V2 may control, for example, rebound damping, low and/or high speed compression damping, lockout, bleed, or blowoff threshold.

Cylinder body 110 will also contain an IFP 150 that divides fluid chamber 115 into first and second fluid chambers 115a, 115b, respectively. While in FIG. 1, IFP 150 is backed by a pressurized and compressible fluid, typically in the form of a gas G contained within second fluid chamber 115b, in other situations the IFP may be backed by a coil spring (not shown). The pressure of gas G within second fluid chamber 115b can either be at ambient (atmospheric) pressure when the damping cylinder is at full extension or may optionally be varied using optional pressurization valve 170, which can be a Schrader Valve (shown schematically). To prevent pressurized gas G within second fluid chamber 115b or damping fluid within first fluid chamber 115a from intermingling, seals, typically in the form of o-rings 160a, 160b, will be used to seal the IFP 150 against the inner wall 110a of cylinder body 110 and the outer surface 120a of shaft 120 (see also e.g. Fox U.S. Pat. No. 6,415,897 (FIG. 7)).

As is known, IFP 150 will be able to move longitudinally within cylinder body 110, as shown by arrows C dependent upon the flow direction of the damping fluid within first fluid chamber 115a. However, due to the seals running against the inner walls of cylinder body 110a and the outer surface of shaft 120a, friction is created. In many damper applications, the effects of friction are undesirable. Finally, for there to be a good seal between the seals and the inner walls 110a of cylinder body 110 and the outer surface 120a of shaft 120, typically the inner walls 110a of cylinder 110 and the outer surface 120a of shaft 120 must be properly prepared with a smooth high-quality surface finish and toleranced/dimensioned, adding cost to the overall damping cylinder.

Having described the prior art, a damping cylinder according to multiple exemplary embodiments of the invention will now be described.

Figure 3:
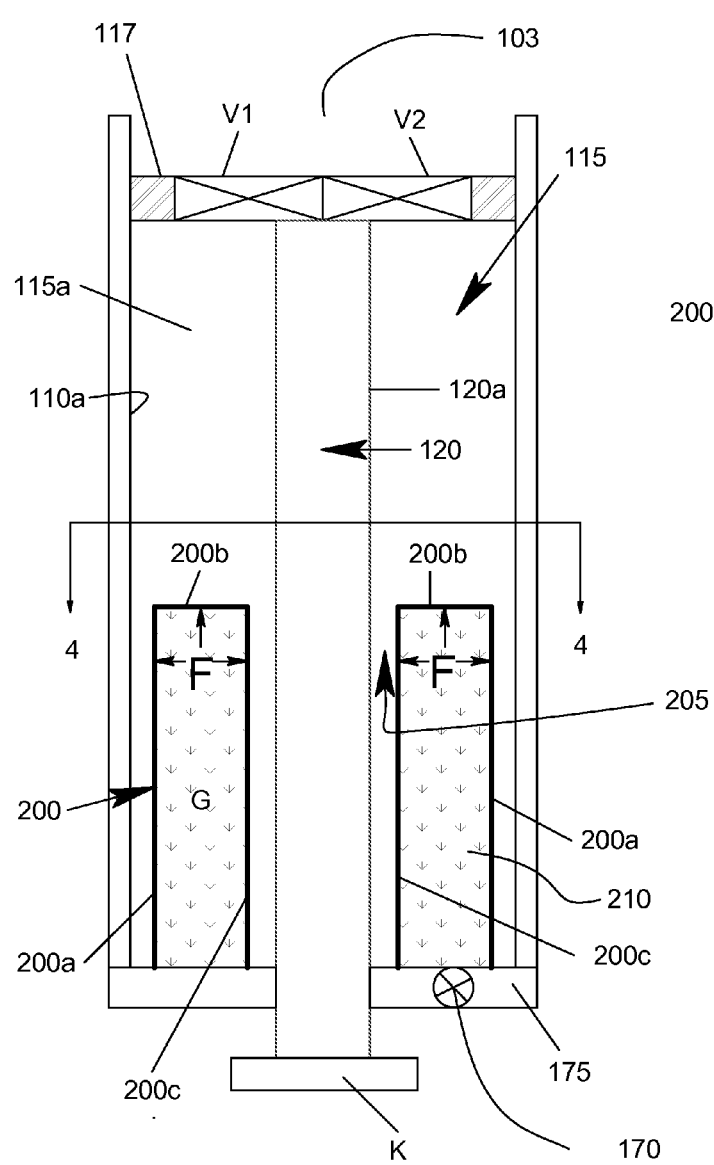
FIG. 3 is a simplified schematic of a damping cylinder according to a first exemplary embodiment of the invention.
Figure 4:
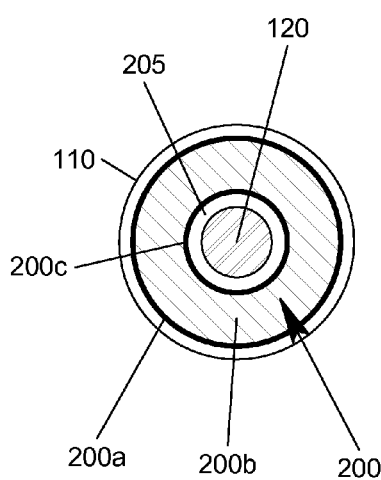
FIG. 4 is a cross section along line 4-4 of FIG. 3.

FIG. 3 is a simplified schematic of a damping cylinder according to a first exemplary embodiment of the invention. FIG. 4 is a cross section along line 4-4 of FIG. 3. When referring to FIGS. 3 and 4, where similar elements are found in FIGS. 1 and 2, the same reference numerals are used.

Figure 5:
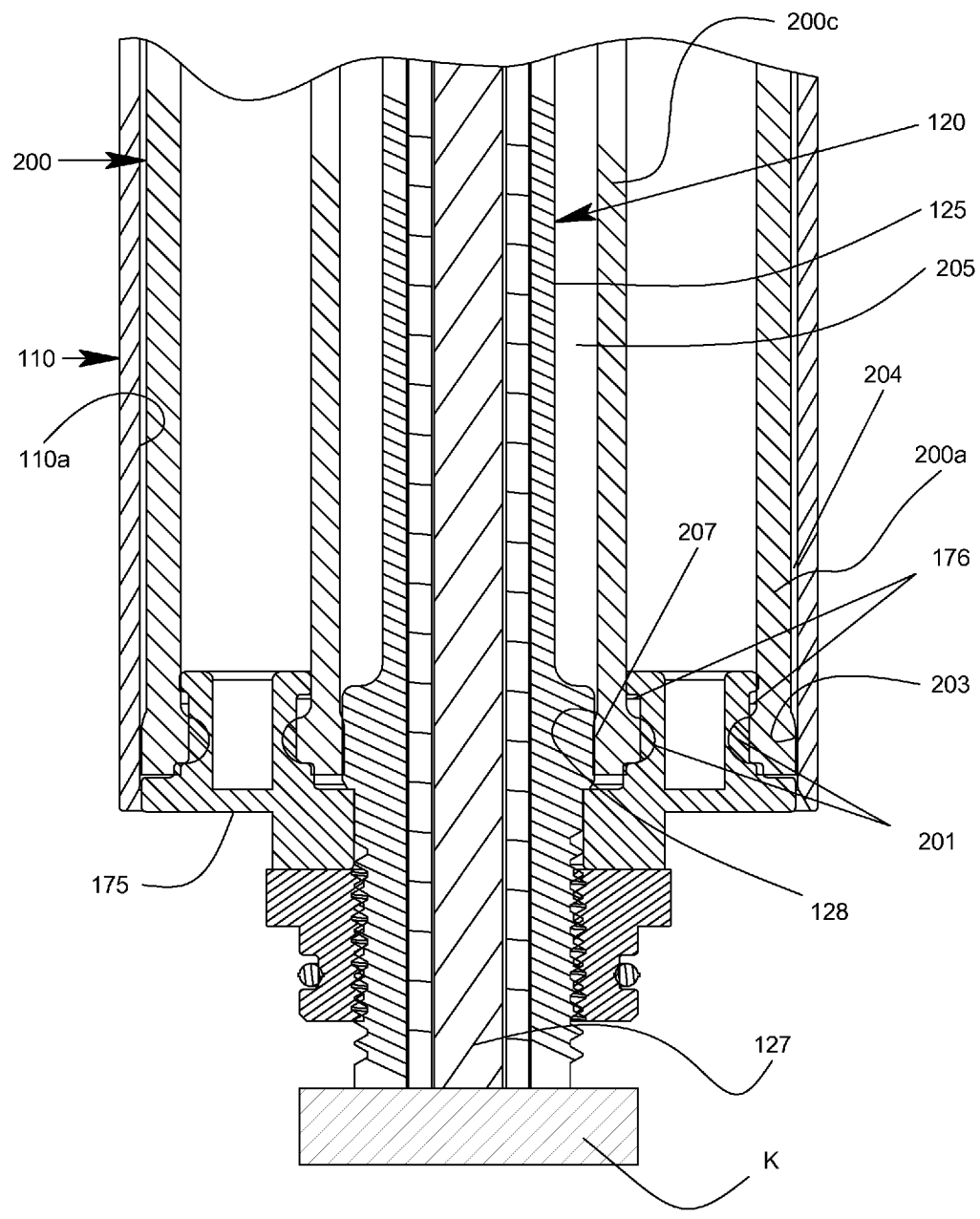
FIG. 5 is a detailed cross-section of a lower portion a damping cylinder according to an exemplary embodiment of the invention.

According to an exemplary embodiment of the invention, IFP 150 is simply replaced with a properly and securely mounted annular bladder 200 (see FIG. 5). Annular bladder 200 will typically comprise a unitary body having outer and inner annular walls 200a, 200c, respectively that are substantially parallel to shaft 120 and connected to each other by a third wall 200b that closes off an end of annular bladder 200 so as to define a bladder fluid chamber 210 within bladder 200. Bladder 200 has no structural connection with the bulk of the damping cylinder 100, except in the area of base 175. Cf. U.S. Pat. No. 4,700,815 (edge of bag 44 is fixed around the inner end of the tubular extension 30 of the cap 22 by means of a spring ring 48). The gas G is contained within the bladder fluid chamber 210 defined by annular bladder 200. As shown in FIG. 4, annular bladder 200 will surround shaft 120 without there being any intermediate structures and with there being a space 205 between shaft 120 and bladder 200 for fluid to be able to fill. The annular bladder 200 may completely surround shaft 120 as shown in the present FIGs, or may at least partially surround the shaft 120 and have, for example, a "c"-shape (not shown). Shaft 120 will extend through space 205 defined by inner annular wall 200c. Furthermore, bladder 200 will also not necessarily come into contact with (and therefore have a clearance from) the inner walls 110a of cylinder body 110. Bladder 200 will typically be constructed from an elastomeric material, capable of withstanding typical damping fluids and elevated temperatures, for example, a high-grade rubber.

FIG. 5 depicts an exemplary method for attaching bladder 200 to cylinder base 175. The open end of bladder 200 will have mounting beads 201 and inner 207 and outer sealing beads 203 formed thereon. Mounting beads 201 will be securely press-fit into grooves 176 of cylinder base 175. Inner sealing beads 207 will be pressed against shoulder 128 of shaft 120 to create a fluid seal for space 205 as well as provide additional structural support for inner bladder wall 200c. Outer sealing beads 203 will be pressed against inner walls 110a of cylinder body 110 to create another fluid seal as well as provide additional structural support for outer bladder wall 200a.

It should be noted that there is a clearance 204 between the outer walls 200a of bladder 200 and the inner walls 110a of cylinder body 110. This clearance, as well as space 205 allow for the purging of excess air and oil from cylinder body 110 during the manufacture of damping cylinder 100. In particular, damping cylinder 110 is manufactured generally as follows:

1) Damping cylinder 100 is inverted from the orientation shown in FIGS. 3-6;
2) Oil is filled into fluid chamber 115 in the same way as if one were filling a cup;
3) Bladder 200 is inserted into the oil-filled chamber 115;
4) Excess oil flows out clearance 204 and space 205;
5) Cylinder base 175 is used to seal off damping cylinder 100.

Finally, as can be seen in FIG. 5, shaft 120 actually may comprise a stationary outer shaft 125 and an inner control rod 127. Inner control rod 127 may be connected to knob K and used to control valves V1, V2, as mentioned above. In some instances, it is possible for there to be multiple control rods associated with multiple valves and/or knobs.

The use of bladders, in general, is known in the art of damping cylinders. Furthermore, annular bladders have also been used. For example, annular bladders were described in U.S. Pat. No. 2,571,279 and U.S. Pat. No. 4,700,815. However, in these patents, the bladder and the shaft are not designed to be immediately adjacent each other without any intermediate structures, as they are in the current exemplary embodiments of the invention.

Therefore, bladders separating a single fluid chamber into two fluid chambers and having a shaft passing there through have not been implemented. It is assumed that they were not used in such situations because it was not readily evident how to effectively maintain the fluid seal between the shaft 120 and the hole that would be needed in the bladder for the shaft to pass through (cf. Fox U.S. Pat. No. 6,415,895 (o-rings between piston and rod)). Note that in U.S. Pat. No. 2,708,112, a metallic member is used to define a reservoir and surrounds a shaft, but it is intended in that patent that fluid can pass from inside the reservoir to outside the reservoir. However, in the present invention, damping fluid is completely retained on one side of the bladder in the bladder fluid chamber and we have found a way to implement a bladder around a shaft without having to worry about any sealing losses due to, for example, degradation of o-rings.

Thus, according to this exemplary embodiment of the invention, as fluid either enters cylinder body 110 via valve V1 or is moved due to shaft 120 and piston 195 (FIG. 6), the increasing volume of fluid within chamber 115 will result in the partial compression of bladder 200 against the internal pressure of gas G in the direction of arrows F. Then, as fluid either leaves the cylinder body 110 via valve V2 or has more volume to fill due to the retraction of shaft 120 and piston 195, the internal pressure of gas G will result in the expansion of the bladder 200 against the fluid to prevent, for example, the creation of a vacuum within cylinder body 110 or the cavitation of the fluid within cylinder body 110. While as the bladder 200 expands and contracts it may come into contact with the inner wall 110a of the cylinder body 110 and/or the outer surface 120a of shaft 120, friction is negligible and much lower than would result from an IFP application. Furthermore, as opposed to applications in which the "bladder" may be fixed at both its ends (e.g. U.S. Pat. No. 4,700,815), the presently described bladder is much more easily and flexibly compressed.

While the invention has been disclosed with reference to certain exemplary features, the scope of the invention shall only be defined by the appended claims.

The invention claimed is:

1. A fluid damper, comprising:
   a cylinder having a wall partially defining a damping fluid chamber;
   a base attached to a first end of the cylinder;
   a shaft extending through the base and into the damping fluid chamber and longitudinally movable relative to the cylinder;
   a piston partially defining the damping fluid chamber and connected to the shaft; and
   an annular bladder having inner and outer walls made from an elastomeric material and substantially enclosing a sealed gas chamber, the shaft movable independent of the bladder,
   wherein:
   the damping fluid chamber has a pressure, the bladder walls are operable to transmit the pressure to the gas chamber during compression and rebound of the fluid damper, a first end of the outer wall is pressed between the cylinder wall and the base, and a first end of the inner wall is pressed between the shaft and the base.

2. The damper of claim 1, wherein:

a portion of the outer wall is radially spaced from the cylinder wall, and a portion of the inner wall is radially spaced from the shaft.

3. The damper of claim 2, wherein:

the bladder walls are operable between an expanded position and a contracted position in response to the pressure in the damping fluid chamber, and the bladder walls are radially spaced in the contracted position.

4. The damper of claim 1, wherein the shaft extends through the damping fluid chamber.

5. The damper of claim 1, wherein the bladder walls are made from rubber.

6. The damper of claim 1, wherein a second end of the bladder is free.

7. The damper of claim 1, wherein the first ends of the bladder walls have mounting beads formed thereon.

8. The damper of claim 7, wherein the first ends of the bladder walls further have sealing beads formed thereon.

9. The damper of claim 1, further comprising a valve:

disposed in the base, and operable to vary pressure of the gas chamber.

10. The damper of claim 1, wherein the damping fluid chamber is filled with oil.

11. The damper of claim 1, wherein the bladder walls extend at least partially around the shaft.

12. The damper of claim 1, wherein the bladder walls extend entirely around the shaft.

13. The damper of claim 1, wherein:

the bladder walls are parallel to the shaft, and first ends of the inner and outer bladder walls are mounted to the base.

14. A fluid damper, comprising:

a cylinder having a wall partially defining a damping fluid chamber;

a base attached to a first end of the cylinder;

a shaft extending through the base and into the damping fluid chamber and longitudinally movable relative to the cylinder;

a piston partially defining the damping fluid chamber and connected to the shaft; and an annular bladder having inner and outer walls made from an elastomeric material and at least partially defining a sealed gas chamber, wherein:

the damping fluid chamber has a pressure, the bladder walls are operable to transmit the pressure to the gas chamber during compression and rebound of the fluid damper; and wherein the first end of the outer wall is pressed between the cylinder wall and the base, and the first end of the inner wall is pressed between the shaft and the base.

* * * * *